April 7, 1925. 1,532,236
L. F. DOUGLASS
METHOD AND APPARATUS FOR PRODUCING MULTIPLE
IMAGE EFFECTS IN PHOTOGRAPHY
Filed Dec. 26, 1922
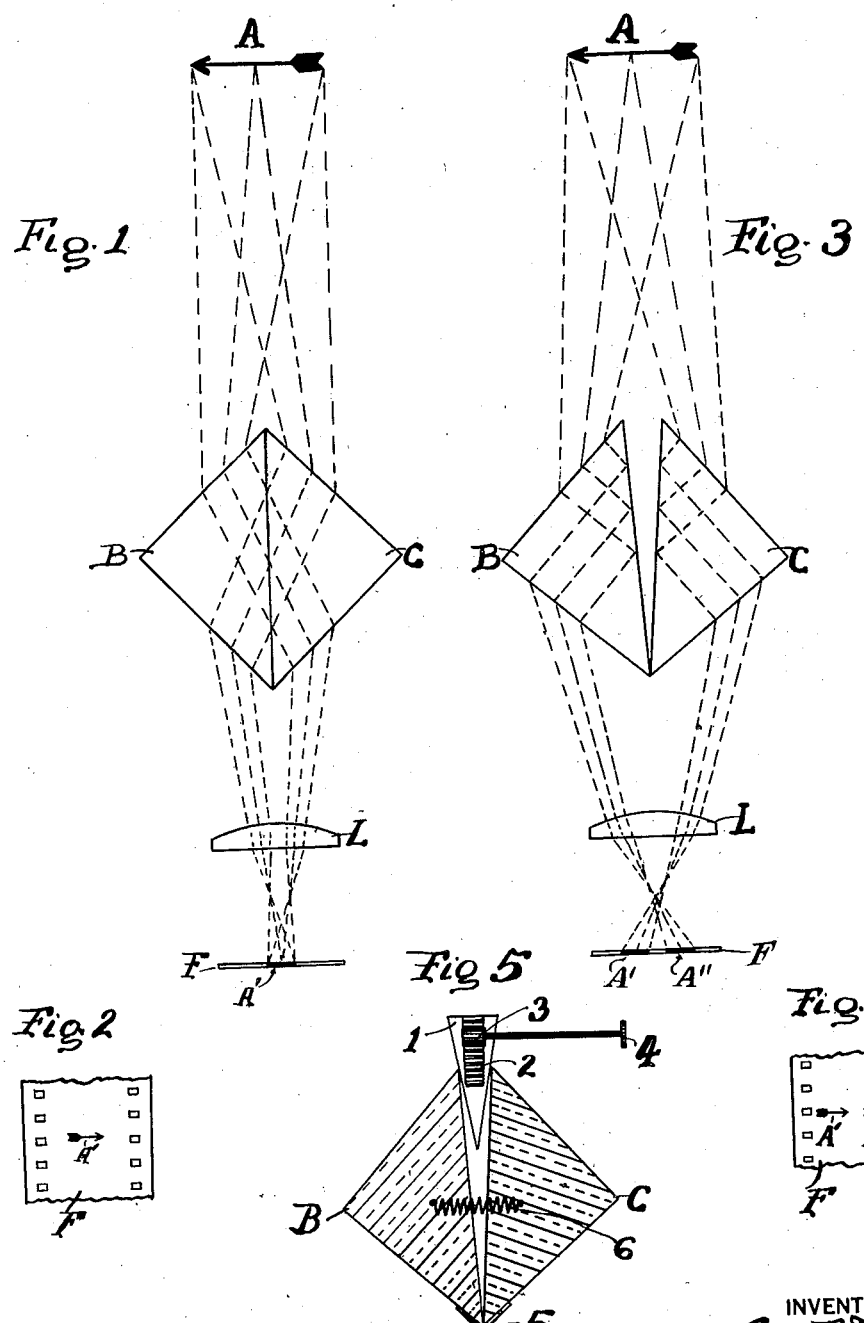

Patented Apr. 7, 1925.

1,532,236

UNITED STATES PATENT OFFICE.

LEON F. DOUGLASS, OF MENLO PARK, CALIFORNIA.

METHOD AND APPARATUS FOR PRODUCING MULTIPLE-IMAGE EFFECTS IN PHOTOGRAPHY.

Application filed December 26, 1922. Serial No. 609,140.

*To all whom it may concern:*

Be it known that I, LEON F. DOUGLASS, a citizen of the United States, and a resident of Menlo Park, in the county of San Mateo and State of California, have invented new and useful Improvements in the Method and Apparatus for Producing Multiple-Image Effects in Photography, of which the following is a specification.

This invention relates to a method and apparatus for producing variable effects on a photographic film or plate, and more particularly, to a method and apparatus whereby at will one or two images of a single object may be produced on a single sensitized film or plate.

An object of this invention is to provide a novel method and improved apparatus whereby one image or two laterally displaced images of a single object may be produced on a single film or plate.

Another object of this invention is to provide apparatus of the type just characterized which may be readily applied to an ordinary camera without change in its mechanism or construction.

Another object of this invention is to provide a novel method and improved apparatus whereby novel effects may be secured upon a single film or plate by manipulating, by means of the adjusting mechanism, the light-refracting elements to refract light rays from a single object through a lens onto a sensitized film or plate.

Another object of this invention is to provide a novel method and improved apparatus whereby novel effects may be secured upon a single film by manipulating, by means of the adjusting mechanism, the light-refracting elements in such a manner that one image is made to gradually form two images or two images are gradually made to come together and form one image, each image being that of the object photographed.

Another object of this invention is to provide apparatus of the type just characterized with means for variably manipulating two light-refracting elements.

In the accompanying drawings, in which for the sake of clearness, the images on the film are shown larger than they actually appear:

Fig. 1 is a diagrammatic view showing the relative arrangement of the object to be photographed, the light refracting prisms with their large faces mutually engaged, the camera lens, the photographic film, and the path of the light rays proceeding from said object through the prisms and the camera lens to the film;

Fig. 2 is a diagrammatic fragment of a photographic film produced when the prisms are in the positions shown in Fig. 1;

Fig. 3 is a diagrammatic view showing the relative arrangement of the object to be photographed, the light refracting prisms with their large faces separated, the camera lens, the photographic film, and the path of the light rays proceeding from said object through the prisms and camera lens to the film;

Fig. 4 is a diagrammatic fragment of a photographic film produced when the prisms are in the positions shown in Fig. 3; and Fig. 5 is a top view of the light-refracting prisms showing the mechanism for regulating the distance between their large faces.

Referring to the said drawings, object A, the subject to be photographed, is positioned in the usual manner directly in front of the lens L, which may be the lens of any suitable camera. Two 90 degree prisms B and C, the large faces of which may be mutually engaged, are positioned directly in front of lens L at a distance of approximately five inches therefrom.

Referring particularly to Fig. 5, prisms B and C have associated with them an adjusting mechanism for regulating the distance between their large faces. The said adjusting mechanism comprises a wedge 1 to which is attached by any suitable means such as glue, a rack 2. Engaging with rack 1 is pinion 3 to which is connected a handle 4. Prisms B and C are hinged at their rear apexes by means of hinge 5 which is attached to the two prisms with glue or any other suitable adhesive. Attached to the ends of prisms B and C by screws, is a wire spring 6 which tends to hold the two engaged faces of the prisms in contact with each other.

When the faces of the two prisms are mutually engaged and it is desired to separate them, the handle 4 is turned toward the right. As the handle 4 is turned as aforesaid, the pinion 3 rotates with it, thereby causing rack 2 and wedge 1 to move towards the prisms. As the wedge moves as aforesaid, its sharp edge comes between the engaged faces of prisms B and C, thereby causing them to become separated. The two prisms move on hinge 5 as their large faces are separated or brought together. Once the two large faces of the prisms have been separated, the handle 4 may be turned toward the left thereby forcing the wedge outward and causing the two large faces of the prisms to come together, by reason of the fact that the wire spring 6 pulls the two prisms together.

The two prisms B and C are placed directly in front of the lens L, in such a manner that an extension of the axis of the lens passes between the engaged faces thereof. Assuming that the prisms B and C are in the position shown in Fig. 1, with their large faces mutually engaged, and it is desired that the object A be photographed. While the two prisms are positioned with their large faces mutually engaged, the light rays proceeding from object A, pass through the said prisms to their mutually engaged surfaces by which the said light rays are reflected to the rear surfaces of the prisms, after which they proceed through lens L to film F where a single image A' of object A is produced. By gradually moving the wedge 1 by means of the handle 4, pinion 3, and rack 2, so that it gradually separates the large faces of prisms B and C, two images of object A gradually appear in an overlapping position on film F; and as the two faces become further separated the two images become laterally displaced. When the two prisms are in the positions shown in Fig. 3, the images A' and A'' are produced in a separated position on the film F, each image being clear and distinct. By manipulating the rack, pinion and wedge, so that the large faces of the prisms are gradually brought together, the two images gradually move toward the center of the film F where they register and form thereon a single image of object A.

It can be readily perceived that I have provided a method and apparatus whereby novel and multiple image effects of a single object may be produced on a single photographic film or plate, and although I have explained but a few of the novel effects which may be produced, it can be seen that many other novel effects may be produced by means of the apparatus herein shown.

Although the embodiments of the invention illustrated on the drawings have been described with considerable particularity, it is to be expressly understood that the means for adjusting the positions of the light-refracting members may be changed without departing from the spirit of the invention.

What I claim is:

1. The method of producing two images of a single object on a photographic film which comprises firstly, refracting and reflecting two pencils of light rays from said object through two large right-angle prisms positioned in front of a camera lens with their large faces adjacent, and secondly, refracting said light rays through said camera lens onto said film.

2. The method of producing variable image effects on a single sensitized film which consists in refracting and reflecting two images of a single object through a camera lens onto said film by interposing two large right-angle prisms, adjustably positioned with their large faces adjacent, in the path of the light rays from said object and in front of said camera lens, moving said prisms so that said images assume different positions on said film, and making successive exposures.

3. The method of producing variable image effects of an object on a sensitized film which consists in refracting and reflecting two images of said object through a lens onto said film by interposing two 90 degree prisms adjustably positioned in front of said lens with their large faces adjacent, moving said prisms to different positions and making successive exposures.

4. Means for producing two laterally displaced images of an object on a sensitized film, comprising, in combination with a lens, two large right-angle light-refracting prisms positioned in front of the camera lens with their large faces adjacent and adapted to refract and reflect said images through said lens onto said film, and means for adjusting the position of the prisms so that the said images may assume different positions on the film.

5. In combination with a camera lens, a plurality of large right-angle light-refracting prisms positioned in front of the camera lens with their large faces adjacent and adapted to refract and reflect a plurality of images of a single object through said lens onto said film, and means for bringing the large faces of the prisms into mutual contact with each other and for separating them.

LEON F. DOUGLASS.